United States Patent
Benninger

Patent Number: 6,001,323
Date of Patent: Dec. 14, 1999

[54] PROCESS FOR PREPARING TIN TETRACHLORIDE

[75] Inventor: Siegfried Benninger, Burgkirchen, Germany

[73] Assignee: Vinnolit Monomer GmBh & Co. KG, Ismaning, Germany

[21] Appl. No.: 09/139,204

[22] Filed: Aug. 24, 1998

[30] Foreign Application Priority Data

Sep. 6, 1997 [DE] Germany .................. 197 39 155

[51] Int. Cl.⁶ .................. C01G 19/08; C01B 9/02
[52] U.S. Cl. .................. 423/494; 423/491
[58] Field of Search .................. 423/491, 494

[56] References Cited

U.S. PATENT DOCUMENTS

| | | | |
|---|---|---|---|
| 1,897,360 | 2/1933 | Buttfield | 423/494 |
| 2,061,816 | 11/1936 | Tyson | 423/494 |
| 4,396,593 | 8/1983 | Schmidt et al. | 423/494 |

FOREIGN PATENT DOCUMENTS

| | | |
|---|---|---|
| 0057929 | 5/1984 | European Pat. Off. . |
| 0094003 | 3/1988 | European Pat. Off. . |
| 0441931 | 1/1994 | European Pat. Off. . |
| 9103425 | 2/1991 | WIPO . |

OTHER PUBLICATIONS

Derwent Abstract Corresponding to EP 0094003 B1 # 83–815575, (Mar. 1988).
Derwent Abstract Coorresponding to EP 0441 931 B1 # 91–081334, (Jan. 1994).
Derwent Abstract Corresponding to EP 0057929 # 82–70574E, (May 1984).

*Primary Examiner*—Ngoc-Yen Nguyen
*Attorney, Agent, or Firm*—Burgess, Ryan & Wayne

[57] ABSTRACT

The preparation of tin tetrachloride from tin granules and chlorine can be conducted safely even at high temperatures if the chlorine, before coming into contact with the tin, is brought into a highly disperse distribution in the circulating tin tetrachloride and develops a uniform flow profile.

2 Claims, 1 Drawing Sheet

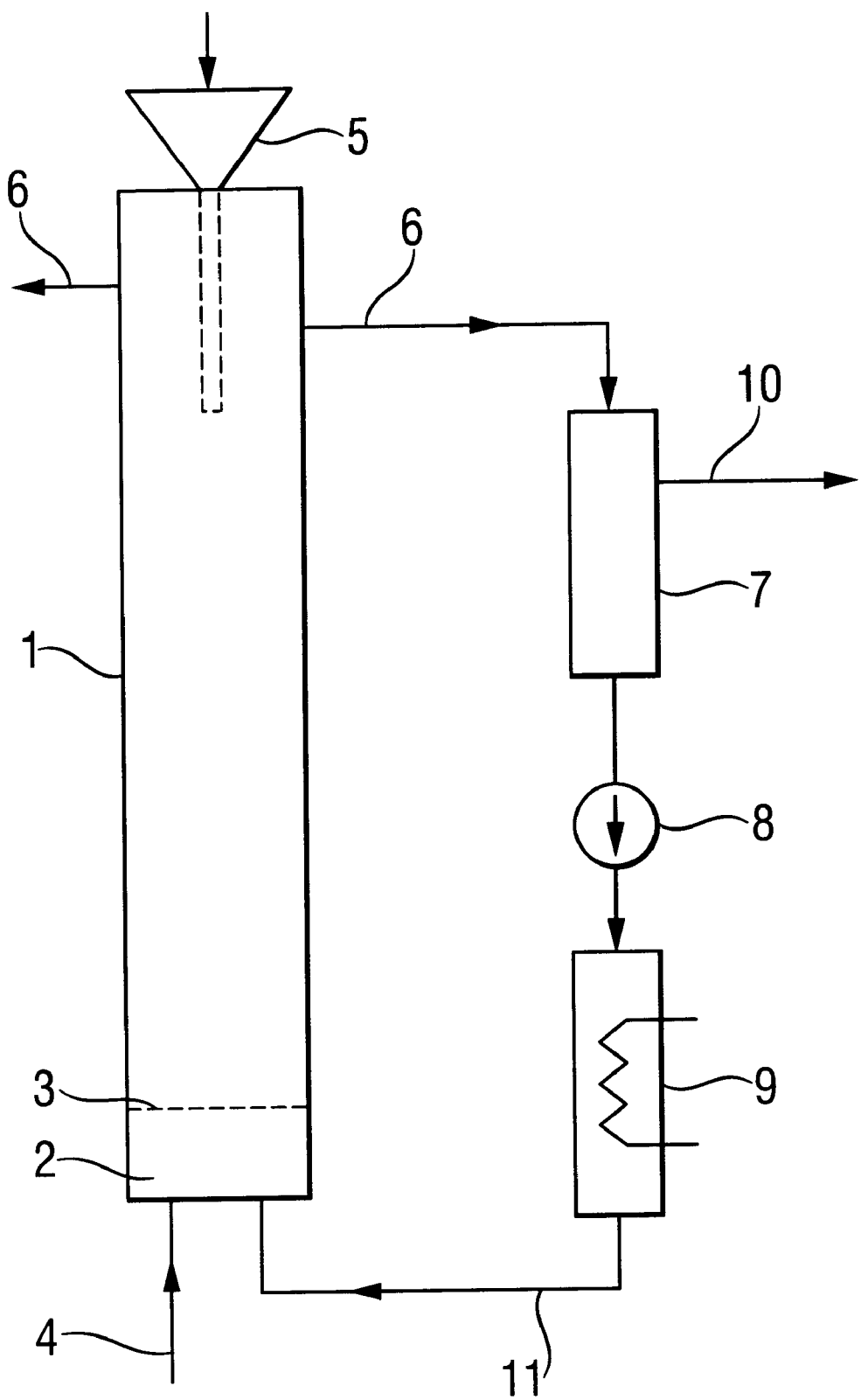

PROCESS FOR PREPARING TIN TETRACHLORIDE

BACKGROUND OF THE INVENTION

1) Field of the Invention

Processes for preparing tin tetrachloride from the elements, tin and chlorine, have long been known, from EP-B-0 057 929, EP-B-0 094 003 and the literature cited therein, for example. In these processes, tin tetrachloride is circulated and chlorine is passed into the reaction chamber from below. The chlorine dissolved in the tin tetrachloride then enters into reaction with the metallic tin.

2) Description of the Related Art

These processes are well established in practice. However, it has been found that, with high specific conversion rates and/or in start-up operation, the reaction cannot be carried out with sufficient reliability. Disruptions may occur as a result of local overheating, leading to melting of the tin granules. This disrupts the required uniform flow traversal of the tin granules. The consequence may be incomplete chlorine consumption in the reactor, and hence a product of increased chlorine content. This may to a greater or lesser extent restrict the production capacity. In the worst-case scenario, there may be total failure of the plant and, as a result of damage to the reactor, the emergence of chlorine and tin tetrachloride.

EP-B2-0 441 931 discloses a process for continuous preparation of tin tetrachloride by reacting excess metallic tin with chlorine in a reaction chamber in the presence of liquid tin tetrachloride, in which tin tetrachloride is removed in a circuit from the reaction chamber, and is passed back with or without cooling, and the amount of tin tetrachloride removed from the circuit is such that the level of tin tetrachloride in the reaction chamber remains the same, said process comprising passing the chlorine into the circulated stream of tin tetrachloride outside the overall circulating reaction chamber in an amount such that it is dissolved completely in the tin tetrachloride. In this process it is said that the good solubility of chlorine in the tin tetrachloride can be utilized with advantage in order to bring about a favorable reaction regime and to allow the reaction conditions to be easily adjusted. When liquid chlorine is used it is said to be possible judiciously to take the heat of evaporation required from the heat of reaction present in the liquid tin tetrachloride emerging from the reactor.

In addition, a slight temperature difference is indicated between the entry of the tin tetrachloride into the reaction chamber (70 to 80° C.) and the exit from the reaction zone (91° C., or 10° C. difference between entry and exit of the main reaction zone of the tin bed). However, this known process gives relatively low space-time yields.

Depending on the space-time yield, in the upper limiting range the difficulties specified at the outset may nevertheless still occur. Although it is in accordance with the teaching of process engineering to counter reactor overheating by temperature monitoring and automatic chlorine shutoff, local overheating of the reaction zone still always puts at risk or limits the plant capacity or availability. Another critical safety point is the loss of the tin tetrachloride supply stream, which is also necessary for dissipating the heat of reaction. In this case the automatic shutoff of the chlorine supply in accordance with the teaching of process engineering is an absolute safety necessity in order to rule out an uncontrolled reaction regime as a result of oversupply of chlorine, with the danger of plant destruction. Nevertheless, the restarting of the plant remains a critical step, which can very easily proceed in an uncontrolled manner. The moment of risk is determined by disruption of the tin bed in the reaction zone in the case of sudden pressure drop, as is the case with failure of the tin tetrachloride circulation pump.

The fine to ultrafine tin sludge formed by reaction of the tin granules in the reaction zone, which has a greatly increased tin surface area, can react with excess chlorine and so give rise to critical temperature peaks. Important in this context is the strong temperature-dependency of the solubility of chlorine in tin tetrachloride; the temperature of the tin tetrachloride circuit which is normally low under startup conditions, corresponds to a chlorine solubility which is much higher than that at the customary reaction temperature. For example, at 20° C. 125.5 g of chlorine dissolve in 1 l of tin tetrachloride, and at 30° C. a further 96 g of chlorine, in each case at 1 bar of chlorine pressure.

SUMMARY OF THE INVENTION

It has now been found that the reaction can be conducted with great safety if it is ensured that the tin tetrachloride in the reactor maintains an extremely flat and symmetrical flow profile relative to the reactor cross section. As a result, the chlorine concentration is distributed with corresponding uniformity over the reactor cross section, thereby avoiding the danger of unwanted hot spots.

One aspect of the invention therefore relates to a process for preparing tin tetrachloride from tin granules and chlorine in a reaction medium comprising circulating tin tetrachloride, which comprises bringing the chlorine, before it comes into contact with the tin, into highly dispersed distribution in the tin tetrachloride in the reactor entry and wherein the chlorine/tin tetrachloride medium develops a uniform flow profile.

Another aspect of the invention relates to an apparatus for reacting chlorine with tin granules in circulated tin tetrachloride. An apparatus of this kind is shown diagrammatically in the FIGURE. In this FIGURE, the reference numerals are defined as follows: a reactor 1, preferably with a cooling zone, judiciously with jacket cooling (not shown in the drawing), a mixing zone 2, a partition 3, a chlorine supply 4, a tin supply 5, an overflow 6, a pump 8, preferably with a pump reservoir 7, a heat exchanger 9, an overflow line 10 and a circulation line 11.

BRIEF DESCRIPTION OF THE DRAWING

The single FIGURE is a diagram of the apparatus for reacting chlorine with tin granules.

DESCRIPTION OF THE PREFERRED EMBODIMENTS

Preferred embodiments of the invention are elucidated further in the following text.

The temperature in the mixing zone in which the highly dispersed distribution is generated is from about 20 to about 60° C., in particular from about 30 to about 50° C. In the reaction zone in which the chlorine reacts with the tin it is from about 70 to about 130° C., preferably from about 70 to about 120° C., and forms a very steep temperature profile. The temperature in the discharge—when a cooling section is employed in the reactor—is from about 80 to 105° C.

Depending on the reactor construction, the process of the invention can be conducted safely at relatively high temperatures in the reaction zone, of from about 70 to about 130° C., at atmospheric pressure, which allows a considerable increase in the specific chlorine throughput and hence in the space-time yield. If an overpressure of up to about 2 bar, measured at the discharge, is employed, then it is possible to operate at temperatures of up to about 155° C. These upper temperature limits are imposed by practical considerations (pressure, heat dissipation, temperature jump in the reactor). In general, and in view of simplified reactor construction, preference will be given to atmospheric pressure in the case of continuous operation. Owing to the relatively high density of the reaction medium (of 2.23 g/cm$^3$ at room temperature) it is possible for the operating range to be increased appropriately merely by the disposition of the reactor overflow (5 m of liquid column correspond to 1.11 bar overpressure, which corresponds in turn to an increase in boiling point to more than 142° C.).

With this procedure, and correspondingly in overpressure operation of the reactors, the chlorine entry is equipped with an anti-backflow means in order to rule out penetration of tin tetrachloride or tin sludge in the case of disruption.

All temperature ranges relate to the steady state. When starting the reaction, if the reaction zone has not yet reached the desired temperature range, therefore, the chlorine should be introduced with appropriate slowness and/or the tin tetrachloride should be preheated to about 60 to 70° C.

It was surprising to find that supplying chlorine directly to the mixing zone at the reactor entry is extremely advantageous relative to the addition of chlorine outside the reactor as known from EP-B-2-0 441 931. Whereas in the case of the process of the invention the temperature at the reactor entry is held very low, judiciously at from about 30 to 50° C., in the known process—as set out earlier—from 70 to 80° C. is specified as a favorable temperature at the entry of the tin tetrachloride into the reaction chamber. At a given flow rate of the tin tetrachloride in the circuit, therefore, this process leads to a substantially longer reaction zone. Relative to the procedure of the invention this is manifested in a substantially flatter temperature profile; in other words, a markedly lower and slower temperature rise over the height of the reactor and otherwise identical conditions. If the entry temperature of tin tetrachloride is lowered, then an incomplete conversion of chlorine is obtained; in other words, the reaction rate—and hence the space-time yield—is restricted to a relatively narrow range in the case of the known process.

An advantage of the introduction of chlorine according to the invention, namely directly into the mixing zone of the reactor entry, is a very short reaction zone with a bed height of just a few centimeters. Associated with this is a correspondingly high temperature jump to the desired operating temperature of from about 70 to about 130° C. in the reaction zone. It should be stressed that, despite the boiling point of 114° C. at atmospheric pressure, the boiling point in the reactor is not reached even at an operating temperature of 130° C. Here, the invention utilizes both the hydrostatic pressure of the tin tetrachloride column in the reactor and a cooling section of the reactor up to the overflow. Said temperature level of 130° C. is therefore to be regarded as a practical upper temperature limit for an effective reactor height (distance between the tin support, in the FIGURE the partition 3, and the overflow, labelled 6 in the FIGURE), which can be influenced accordingly in the case of non-pressurized reactor operation.

The comparatively short reaction zone has the great advantage that the residual chlorine is consumed completely within just a small height above the reaction zone. Hence, for the given example of an effective reactor height of 5 m, it is sufficient to have a tin bed which corresponds to a contact time of from about 45 to 90 seconds; at a flow rate of tin tetrachloride of from about 1 to 3 m/min—calculated without tin packing this corresponds, for example, to a preferred tin granule bed of from about 1.5 to 3 m in height.

The mode of chlorine introduction according to the invention therefore makes it possible, surprisingly, to employ a reaction regime which can be readily and safely controlled even in large-scale plants, which features space-time yields which are higher than in the prior art, and in which a fully chlorine-free product is obtained.

The mixing zone 2 in which the chlorine is brought into highly dispersed distribution and in which the flow profile of the circulating tin tetrachloride is rendered uniform constitutes a customary mixing element which meets these requirements—highly dispersed distribution of a gas in a liquid medium. It has been found that customary static mixers, known in process engineering, provide decisive improvement in the safety and manageability of the process. In particular, it is found—as a complete surprise—that this reactor construction enables the space-time yields to be increased markedly in comparison to the known process.

In one embodiment of the invention the reactor entry, i.e. the space below the actual reaction chamber (which is defined by the presence of the tin), is filled with packing media. Expediently, this part of the reactor tapers downward in the manner of a funnel. The supply of gaseous chlorine is then passed into this entry space in the manner, for example, of a Venturi nozzle.

In a further embodiment of the invention, the area between the support lattice as the limit of the tin granules and the chlorine entry point is designed as a static mixing element. The purpose of the apparatus is highly dispersed distribution of chlorine gas within a short period. The choice of a static mixing element is a matter of economic and technical expediency in order to achieve the highly dispersed distribution of chlorine gas. This can also of course be achieved by an input of kinetic energy; for example, using a turbine agitator. The key point is that this highly dispersed distribution is present directly prior to entry of the chlorine/tin tetrachloride phase into the tin granule zone. Independently of this, the requirement is that the flow profile should be made as uniform as possible over the reactor cross section.

The novel embodiment of the reactor very largely avoids the difficulties, specified at the outset, that are experienced when starting up the reaction and following interruptions. The novel reactor construction and process regime also permit more rapid and safer start-up of the reaction than reactors known to date, since the temperature regime is easy to control.

As regards the other reaction conditions, reference may be made to the cited prior art.

The invention is illustrated by the following examples.

EXAMPLE 1

A stainless steel reactor with an internal diameter of 400 mm and with jacket cooling is employed. The tin bed rests on a perforated plate with 10 mm perforations and on a number of overlying stainless steel screens with a mesh size of 2 mm. The overflow of tin tetrachloride to a pump reservoir is arranged at a height of 5.5 m above the perforated plate. Below the perforated plate there is a static mixer with entries for chlorine and tin tetrachloride, which produces a highly dispersed distribution of the chlorine in the tin tetrachloride and—prior to entry into the tin bed—a uniform flow profile. A tube heat exchanger is built into the circuit line for the tin tetrachloride.

This reactor is charged with 3–6 mm granules of 99.95% pure tin. The bed height is 2.0 m, and is maintained by continuous and automatic supplementation. 115 m$^3$/h (s.t.p.) chlorine are metered in at the reactor entry at a tin tetrachloride temperature of 19° C.; tin tetrachloride is pumped in circulation at a rate of 13.5 m$^3$/h. The reactor is operated at atmospheric pressure. After the steady state has been established, a temperature of 94° C. is measured at a height of 10 cm above the perforated plate and 89° C. at a height of 100 cm above the perforated plate. The overflow has a temperature of 80° C. The chlorine concentration was <1 ppm.

The degree of conversion, based on the chlorine, is stoichiometric. After 24 hours, a tin tetrachloride quantity of 16.35 t was obtained. The space-time yield of tin tetrachloride is 2.71 kg/dm$^3$ of tin granules.h.

EXAMPLE 2

Example 1 is repeated with the following modifications:

The temperature at the reactor entry is 33° C., and 80 m$^3$/h (s.t.p.) chlorine are metered in. The circulation rate is 12 m$^3$ of tin tetrachloride/h.

The following temperatures are measured:
at a height of 10 cm: 89° C.
at a height of 100 cm: 85° C.
overflow: 76° C.

After 30 hours, 14.2 t of tin tetrachloride are found with a chlorine concentration of <1 ppm.

The space-time yield is found to be 1.89 kg/dm$^3$.h.

What is claimed is:

1. A process for preparing tin tetrachloride in a reactor and from tin granules and chlorine in a circulated tin tetrachloride as reaction medium, wherein the chlorine is brought into a highly disperse distribution in the circulating tin tetrachloride by using a static mixer in a mixing zone of the reactor entry before the formed chlorine/tin tetrachloride medium comes into contact with the tin, and the chlorine/tin tetrachloride medium develops a uniform flow profile.

2. The process as claimed in claim 1, wherein the temperature in the mixing zone in which the highly disperse distribution is produced is from about 20 to about 60° C. and in the reaction zone in which the chlorine is in contact with the tin granules is from about 70 to about 130° C.

* * * * *